United States Patent Office 3,652,460
Patented Mar. 28, 1972

3,652,460
METHOD FOR THE PREPARATION OF A CYCLO-HEXANOL-TO-CYCLOHEXANONE DEHYDROGENATION CATALYST
Nester Petrovich Emelyanov, Ulitsa Kavaleriiskaya 10, kv. 4; Rogneda Ivanovna Belskaya, Ulitsa Ya. Kolosa 26, kv. 27; and Rostislav Yakovlevich Semyachko, Melnichny pereulok 17, kv. 2, all of Minsk, U.S.S.R.
No Drawing. Filed Oct. 31, 1969, Ser. No. 873,095
Int. Cl. B01j 11/00
U.S. Cl. 252—475
10 Claims

ABSTRACT OF THE DISCLOSURE

A process of preparing a catalyst for cyclohexanol dehydrogenation to cyclohexanone which comprises impregnating zinc oxide with a solution of cupric nitrate, followed by treating the resultant mass with a solution of oxalic acid and thereafter with hydrogen.

This invention relates to methods for the preparation of a catalyst for use in a cyclohexanol-to-cyclohexanone dehydrogenation process.

It is known to prepare such catalyst by mixing cupric oxide and zinc oxide in a weight ratio of 1:1 and treating the resultant mixture with hydrogen. At 395° C., cyclohexanol undergoes dehydrogenation over this prior art catalyst to the extent of 65%.

It is further known to prepare a dehydrogenation catalyst by mixing wet pastes of copper formiate and zinc oxide, followed by treating the resultant mixture with hydrogen. Cyclohexanol dehydrogenation over this catalyst at a temperature of 265° C. provides a cyclohexanone yield of not more than 2–5%.

The first of the prior art methods is disadvantageous in that the catalyst obtained exhibits inadequate activity as evidenced by the fact that dehydrogenation must be carried out at relatively high temperatures, while the conversion of cyclohexanol to cyclohexanone remains relatively low.

The second method has the disadvantage that the catalyst obtained is of low activity, so that the conversion of cyclohexanol to cyclohexanone over said catalyst is quite insignificant.

The process of cyclohexanol dehydrogenation over said catalysts is, therefore, inefficient.

It is an object of the present invention to provide a method of preparing a highly active and selective catalyst for cyclohexanol dehydrogenation which will make it possible to obtain cyclohexanone in good yield at a relatively low temperature of the dehydrogenation process (280–320° C.).

In accordance with this and other objects, there is provided a method for the preparation of a cyclohexanol-to-cyclohexanone dehydrogenation catalyst by depositing copper compounds on zinc oxide, followed by treatment with hydrogen wherein, according to the invention, zinc oxide is impregnated with cupric nitrate, and the resultant mass is treated first with an oxalic acid solution and thereafter with hydrogen.

The method of the invention makes it possible to prepare a catalyst noted for its freedom from deleterious impurities, having an optimum porous structure and displaying a more uniform copper distribution over the carrier surface. Other advantages of the catalyst prepared by the present method are its high selectivity, thermal stability, adequate mechanical strength, and long service life.

To enhance the catalyst activity, it is expedient to subject the catalyst after treatment with hydrogen to additional treatment with oxygen and then again with hydrogen, the preferred practice being to repeat the successive treatment with oxygen and hydrogen at least two times.

The employment of the catalyst prepared in accordance with the present method to dehydrogenate cyclohexanol results in a cyclohexanone yield of up to 88.6% based on the starting alcohol or of 96.4% of the theoretical amount.

The present method of preparing the cyclohexanol-to-cyclohexanone dehydrogenation catalyst is accomplished as follows:

Zinc oxide is impregnated with a solution of cupric nitrate, the amount of cupric nitrate deposited on zinc oxide being 2–20%, preferably 3–7%, based on the zinc oxide weight. Next, the catalyst mass is treated with an excess of oxalic acid and washed with distilled water until the washings show no reaction for nitrate-ions. The precipitate is dried, comminuted and screened. The catalyst mass is treated with hydrogen directly before carrying out the process of dehydrogenation in a reaction vessel. Hydrogen treatment is effected at a temperature of 280–340° C. and a hydrogen feed rate of 5–10 l./hr. for a period of 1–4 hours.

In order to enhance catalytic activity, the catalyst after the step of hydrogen treatment, is treated with oxygen at a temperature of 280–340° C. and an oxygen feed rate of 3–6 l./hr. for a period of 20–60 minutes, followed by treatment at the same temperature and for a period of 20–60 minutes with hydrogen fed at a rate of 5–10 l./hr. The successive treatment of the catalyst with oxygen and hydrogen should be carried at least twice.

The catalyst prepared by the present method is effective for carrying out cyclohexanol dehydrogenation, preferably in a fluidized bed at relatively high space velocities and under relatively low reaction temperatures. Under the aforespecified conditions, cyclohexanol-to-cyclohexanone conversion is high.

For a better understanding of the invention, the following examples of catalyst preparation are presented by way of illustration.

EXAMPLE I 108 g. of zinc oxide (purity, 99.5%) is impregnated with 600 ml. of a 5% solution of cupric nitrate (cupric nitrate purity, 99.6%). The precipitate is sucked off on a Buchner funnel, treated with 800 ml. of a 5% solution of oxalic acid (oxalic acid purity, 99.6%), sucked off again, and washed with distilled water until the washings show no reaction for nitrate-ions. The precipitate is dried to constant weight at 80° C., comminuted, and screened. The resultant catalyst mass is treated, prior to the dehydrogenation process, in the reaction vessel at a temperature of 280° C. for a period of 1 hour by passing therethrough a stream of hydrogen at a feed rate of 6–6.5 l./hr.

The catalyst thus prepared has the following characteristics:

Copper content in catalyst, percent by weight _____ 3.8
Grain size, mm. _____ 0.12–0.16
Bulk weight, g./cm.$^3$ _____ 0.75
Specific surface area, m.$^2$/g. _____ 8.2

Table I lists the results of cyclohexanol dehydrogenation to cyclohexanone in the fluidized bed of the catalyst prepared as described hereinabove.

TABLE 1

| Catalyst charge, g. | Reaction temp.° C. | Space velocity, hr.⁻¹ | Contact time, sec. | Cyclohexanol feed, g. | Cyclohexanone obtained, g. | Yield of cyclohexanone, percent | |
|---|---|---|---|---|---|---|---|
| | | | | | | Based on alcohol feed | Based on the theoretical amount |
| 2.8 | 280 | 9,500 | 0.40 | 36.0 | 19 | 54 | 67.0 |
| 2.8 | 280 | 8,300 | 0.44 | 30.0 | 21 | 70 | 86.5 |
| 2.8 | 280 | 4,820 | 0.75 | 18.9 | 14 | 72 | 89.0 |
| 2.8 | 300 | 8,300 | 0.44 | 30.0 | 22 | 75 | 85.5 |
| 2.8 | 300 | 6,000 | 0.60 | 22.0 | 16 | 74 | 84.0 |

EXAMPLE 2

The catalyst is prepared by following the procedure of Example 1. The catalyst thus obtained is treated with oxygen at a feed rate of 4–4.5 l./hr. and a temperature of 280° C. for a period of 20–30 minutes, followed by treatment for a period of 20–30 minutes with hydrogen at a feed rate of 6–6.5 l./hr., the temperature being the same. Catalyst treatment with oxygen and hydrogen is repeated twice, and the resultant catalyst has the same characteristics (copper content, grain size, bulk weight, and specific surface area) as the catalyst of Example 1.

Listed in Table 2 are the results of cyclohexanol dehydrogenation to cyclohexanone in the fluidized bed of the catalyst prepared as disclosed hereinabove.

TABLE 2

| Catalyst charge, g. | Reaction temp.° C. | Space velocity, hr.⁻¹ | Contact time, sec. | Cyclohexanol feed, g. | Cyclohexanone obtained, g. | Yield of cyclohexanone, percent | |
|---|---|---|---|---|---|---|---|
| | | | | | | Based on alcohol feed | Based on the theoretical amount |
| 3.5 | 260 | 4,138 | 0.87 | 18.9 | 13.4 | 72.0 | 100.0 |
| 2.8 | 280 | 6,666 | 0.54 | 38.5 | 31.2 | 82.0 | 100.0 |
| 3.5 | 280 | 4,500 | 0.80 | 18.9 | 15.1 | 81.5 | 100.0 |
| 2.8 | 280 | 2,770 | 1.30 | 15.4 | 12.4 | 82.0 | 100.0 |
| 2.8 | 300 | 5,140 | 0.70 | 35.0 | 29.2 | 85.1 | 96.6 |
| 3.5 | 300 | 4,500 | 0.80 | 18.9 | 15.8 | 85.3 | 96.7 |
| 2.0 | 320 | 8,000 | 0.45 | 18.9 | 16.4 | 88.6 | 96.4 |

The data in Table 2 show that the optimum conditions for the production of cyclohexanone are as follows: reaction temperature, 300–320° C.; space velocity, 4,500–8,000 hr.⁻¹ and contact time 0.8–0.45 sec. Under these conditions, cyclohexanone is obtained in a yield of 85–88.6% based on the alcohol feed, or 96.7–96.4% of the theoretical amount.

Although the present invention has been described with reference to preferred embodiments thereof, many modifications and changes will occur to those skilled in the art. It is therefore, to be understood that the appended claims are intended to cover all such modifications and changes as fall within the true spirit and scope of the invention.

We claim:

1. A process of preparing a catalyst for cyclohexanol dehydrogenation to cyclohexanone comprising impregnating zinc oxide with a solution of cupric nitrate, and contacting the resultant mass first with a solution of oxalic acid, and thereafter with hydrogen.

2. A process according to claim 1, wherein the catalyst obtained after hydrogen contact is subjected to contact first with oxygen and then with hydrogen, said successive contact with oxygen and hydrogen being carried out at least two times.

3. A process according to claim 1 wherein the amount by weight of cupric nitrate is between 2 to 20% based on the weight of zinc oxide.

4. A process according to claim 3 wherein said amount by weight of cupric nitrate based on the weight of zinc oxide is between 3 and 7%.

5. A process according to claim 1 wherein the oxalic acid is present in excess.

6. A process according to claim 1 wherein the contact with hydrogen is effected at elevated temperature.

7. A process according to claim 6 wherein the temperature of the hydrogen contact is between 280–340° C. and the contact is for 1–4 hours at a feed rate of hydrogen of 5 to 10 l./hr.

8. A process according to claim 2 wherein the first contact with the hydrogen is effected at elevated temperature, and the subsequent contact with oxygen and hydrogen are also effected at elevated temperature.

9. A process according to claim 8 wherein said elevated temperature of the first and subsequent contacts is between 280 and 340° C.

10. A process according to claim 9 wherein the first contact with hydrogen is for 1–4 hours at a feed rate of hydrogen of 5 to 10 l./hr., the subsequent contact with oxygen being for 20 to 60 minutes at an oxygen feed rate of 3 to 6 l./hr., and the subsequent contact with hydrogen being for 20 to 60 minutes at a hydrogen feed rate of 5 to 10 l./hr.

References Cited

UNITED STATES PATENTS 3,336,399   8/1967   Gac _____ 260—621

DANIEL E. WYMAN, Primary Examiner

P. M. FRENCH, Assistant Examiner